(No Model.)
H. V. HAYES.
ELECTRIC CABLE.
No. 469,522.  Patented Feb. 23, 1892.
Fig. 1. Fig. 3. Fig. 5. Fig. 7.
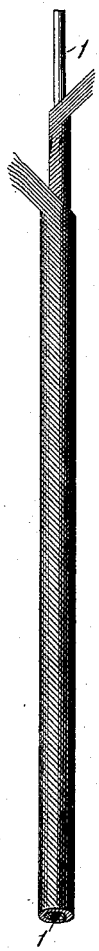 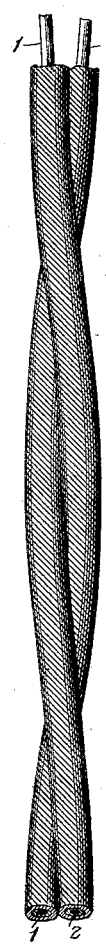 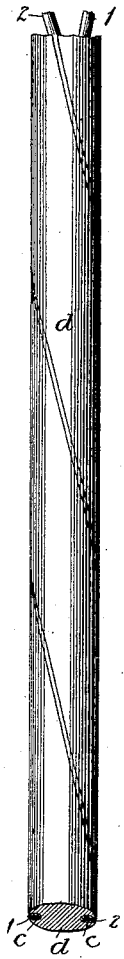 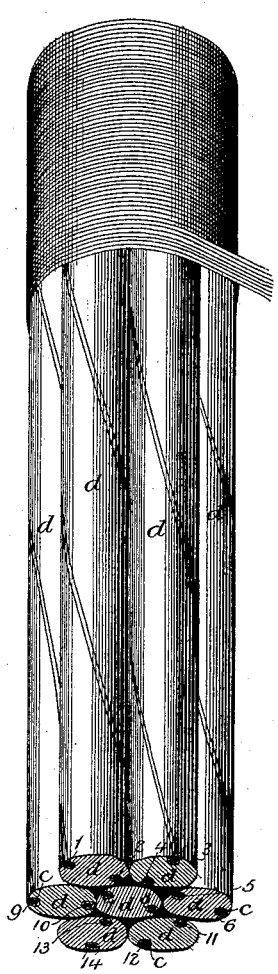
Fig. 2. Fig. 4. Fig. 6. Fig. 8.
   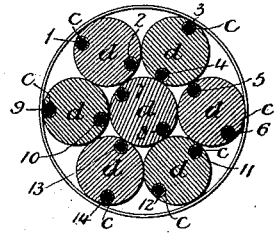
WITNESSES
Will. T. Norton
Jonathan Alley
INVENTOR
Hammond V. Hayes
By A. Pollok, his Attorney.
THE NORRIS PETERS CO., PHOTO-LITHO., WASHINGTON, D. C.

UNITED STATES PATENT OFFICE.

HAMMOND V. HAYES, OF CAMBRIDGE, MASSACHUSETTS.

ELECTRIC CABLE.

SPECIFICATION forming part of Letters Patent No. 469,522, dated February 23, 1892.

Application filed August 16, 1889. Serial No. 321,032. (No model.)

*To all whom it may concern:*

Be it known that I, HAMMOND V. HAYES, of Cambridge, in the State of Massachusetts, have invented a new and useful Improvement in Electric Cables, of which the following is a specification.

The invention has reference to the static capacity of electric cables for metallic circuits; and its object is the construction of an electric cable of several metallic circuits in which the static capacity of wires of a given size in each circuit shall be at a minimum.

It is well known that static capacity in both telephone and telegraph lines, more especially in telephone lines, is detrimental, since the static capacity of the wire tends to smooth down the sounds or signals or to cause successive sounds or signals to overlap each other. It is also well known that the static capacity of a telephone or telegraph wire in a single-wire circuit increases as the exposed surface of the wire increases and as the distance of the wire from the return-circuit—*i. e.*, the earth—and parallel wires connecting with the return-circuit—*i. e.*, the earth—decreases, and likewise that the same law obtains in metallic circuits, both in telephone and telegraph lines, the return-wire in such circuit taking the place of the earth in the single-line circuit. That is, it is well known that the static capacity of a metallic circuit decreases as the distance between the two wires is increased and as their diameter is decreased, and also that this capacity of the metallic circuit is increased by the proximity of other circuits. Accordingly when using wires of a given size in a metallic-circuit cable of a given size it is desirable to put the two wires of each circuit as far apart as possible without diminishing the number of circuits in the cable; but at the same time care must be taken that the capacity of a wire to its mate, due to the proximity of the other circuits in the cable, is not unduly increased.

Heretofore in the manufacture of metallic-circuit electric cables it has been the practice to envelop each wire in an insulating material—that is, for example, a wire of a diameter of .0403 of an inch has been wound in insulating material to a diameter of .125 of an inch. The two wires of each circuit have been twisted together the entire length of the circuit, forming two spirals about a common axis, so that each might be equally affected by inducing currents from harmful sources, and then these two wires thus twisted have been made into a cable with other pairs of wires forming other circuits similarly insulated and twisted in a great variety of ways. In this construction the two wires of each circuit are separated from each other across the common axis by double the thickness of the insulating material, or nearly .085 of an inch; but each separate wire of each circuit is everywhere separated from every other wire in the cable by at least the same distance. As already stated, the two wires of a circuit are twisted together to form a double spiral, so that the mean distance of each from another exterior conductor shall be the same, and consequently any inductive influence from such conductor shall be neutralized. It will be easily seen that to increase or diminish the distance of the two twisted wires of a circuit from their common axis, and thus their distance from each other across that axis, will not increase or diminish their mean distance from such an exterior conductor or prevent the neutralization of its inductive influence. Neither would such increase or decrease of the diameter of the spirals affect the influence of such exterior conductor upon the static capacity of the spirals; but it would materially affect the influence of the spirals themselves upon their static capacity with reference to each other. I avail myself of these principles to combine a spiral metallic circuit with insulating material in such a manner that its static capacity, as compared with a spiral circuit combined as heretofore, may be diminished without increasing the space it requires in a cable, or, on the other hand, that such space may be diminished without increasing the static capacity. Where in the old construction the distance between the wires of each pair was .085 of an inch, in the new construction it may be nearly .15 of an inch, or if the distance .085 of an inch is retained there may be several more circuits. To accomplish this the direct and return wires of a circuit are twisted or wound spirally around a common axis, as in the old construction; but the insulating material about each wire, or, what is the same thing, the insulation pertaining to each pair of wires or to each metallic circuit, is unequally disposed, so that the main part of it lies between the two wires of a metallic circuit, while only a slight covering of insulating material is applied to the sides or portions of the two wires farthest apart from each other; and when the circuits are bunched, since the two wires of each are twisted about each other or wound spirally about a common axis, the mean distance or insulation between a wire of one circuit and the wires of adjoining circuits, as before stated, will remain practically the same, although at times it may be exceedingly small or light, and the static capacity of any one wire to its mate will not be thereby increased.

In the drawings, Figure 1 is a single insulated wire, such as has heretofore been used in the construction of cables. Fig. 2 is a cross-section of the same. Fig. 3 is a pair of similar wires twisted to form a metallic circuit. Fig. 4 is a cross-section of said pair. Fig. 5 is an insulated metallic circuit formed according to my invention. Fig. 6 is a cross-section of the same. Fig. 7 is a cable laid up according to my invention. Fig. 8 is a cross-section of the cable shown in Fig. 7.

Where a single pair of wires is shown forming a single metallic circuit, the wires are numbered 1 2. Where several pairs are shown laid up in a cable, the wires of one circuit are marked 1 2, the next 3 4, the next 5 6, and so on.

The figures in the drawings are on an enlarged scale.

Fig. 5, as before stated, represents a pair of wires put together to form a single metallic circuit according to my invention. Each wire of the pair 1 and 2, making a metallic circuit, has at first but a slight insulation or is enveloped in a single thin course of insulating material $c$, and thus insulated the two wires are embedded spirally in a cylinder of suitable insulating material $d$—such as paper or cotton soaked in paraffine, gutta-percha, rubber, kerite, &c.—the said two wires starting and being always throughout their respective spirals on opposite sides of such cylinder and near the surface thereof, so that the distance or thickness of insulation between the inner surface of either wire and the common axis of the spirals is greater than the thickness of insulation on the outer surface of that wire; or, in other words, the distance from the common axis of the spirals to the inner surface of the wires is greater than the distance from the outer surface of the wires to the outer surface of their insulating-coverings. Thus the sides of the direct and return wires of a metallic circuit which are nearest or opposed to each other become widely separated from each other in comparison with the corresponding distance between the nearest or opposed sides in the old construction, while the outer surfaces of the same wires have only a slight insulation compared with the corresponding insulation in the old construction.

Other ways of combining the two wires of a metallic circuit with their insulating material in such manner that the amount of insulating material between their respective opposed surfaces and their common axis is greater than that on their outer surfaces, or those farthest apart will readily suggest themselves.

The several pairs of wires are secured together in a cable in any ordinary way.

I claim—

1. A metallic electric circuit in which the direct and return wires are combined spirally with insulating material in such manner that the thickness of the insulating material from the common axis of the spirals to the inner surfaces of the wires, which are separated by substantially the diameter of the spirals, is greater than its thickness on the exterior surfaces, substantially as described.

2. An electric cable comprising several metallic circuits, in each of which the direct and return wires are combined spirally with insulating material common to the two, substantially as described, whereby the distance between the direct and return wires of each circuit is equal to nearly the full diameter of their spirals whatever may be the distance between wires of different circuits.

HAMMOND V. HAYES.

Witnesses:
W. W. SWAN,
HENRY CHADBOURN.